US012598599B2

(12) United States Patent
Xiao et al.

(10) Patent No.: US 12,598,599 B2
(45) Date of Patent: Apr. 7, 2026

(54) METHODS AND APPARATUS FOR SEMI-PERSISTENT SCHEDULING (SPS) DOWNLINK TRANSMISSION

(71) Applicant: LENOVO (BEIJING) LIMITED, Beijing (CN)

(72) Inventors: Lingling Xiao, Beijing (CN); Bingchao Liu, Beijing (CN); Chenxi Zhu, Fairfax, VA (US); Wei Ling, Beijing (CN); Yi Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 415 days.

(21) Appl. No.: 18/248,470

(22) PCT Filed: Oct. 10, 2020

(86) PCT No.: PCT/CN2020/120160
§ 371 (c)(1),
(2) Date: Apr. 10, 2023

(87) PCT Pub. No.: WO2022/073227
PCT Pub. Date: Apr. 14, 2022

(65) Prior Publication Data
US 2023/0413257 A1 Dec. 21, 2023

(51) Int. Cl.
*H04W 72/11* (2023.01)
*H04L 1/1812* (2023.01)
*H04W 72/232* (2023.01)

(52) U.S. Cl.
CPC ........... *H04W 72/11* (2023.01); *H04L 1/1812* (2013.01); *H04W 72/232* (2023.01)

(58) Field of Classification Search
CPC .... H04W 72/11; H04W 72/232; H04L 1/1812
(Continued)

(56) References Cited

U.S. PATENT DOCUMENTS

| 2021/0135946 A1* | 5/2021 | Babaei .................. H04L 1/1854 |
| 2022/0210862 A1* | 6/2022 | Cirik .................... H04L 5/0091 |

(Continued)

FOREIGN PATENT DOCUMENTS

| CN | 110536460 A | 12/2019 |
| WO | 2020033849 A1 | 2/2020 |
| WO | 2020144869 A1 | 7/2020 |

OTHER PUBLICATIONS

International Search Report and Written Opinion dated Jun. 29, 2021 for International Application No. PCT/CN200/120160.

*Primary Examiner* — Faisal Choudhury
(74) *Attorney, Agent, or Firm* — AMPACC Law Group, PLLC

(57) ABSTRACT

Embodiments of the present disclosure relate to methods and apparatus for semi-persistent scheduling (SPS) downlink transmission. According to an embodiment of the present disclosure, a method may include: receiving a set of first downlink control information (DCI) on at least one control resource set (CORESET) for activating a set of SPS configurations, wherein each CORESET is configured with a CORESETPoolIndex, and each of the set of first DCI activates a corresponding one of the set of SPS configurations; and receiving a set of second DCI on at least one first CORESET configured with a first CORESETPoolIndex, wherein each second DCI only deactivates first one or more SPS configurations of the set of SPS configurations activated by first one or more first DCI received on one or more CORESETs configured with the first CORESETPoolIndex.

15 Claims, 6 Drawing Sheets

(58) Field of Classification Search
USPC .......................................................... 370/329
See application file for complete search history.

(56)                    References Cited

U.S. PATENT DOCUMENTS

| | | | | |
|---|---|---|---|---|
| 2022/0393829 A1* | 12/2022 | Kim | ...................... | H04L 5/0094 |
| 2023/0379108 A1* | 11/2023 | Grossmann | ........... | H04L 5/0048 |

* cited by examiner

| SPS deactivation state entry | SPS configurations in a deactivation state | SPS deactivation state entry | SPS configurations in a deactivation state |
|---|---|---|---|
| 00000 | SPS Config #0 | 10000 | SPS Config #5 |
| 00001 | SPS Config #1, SPS Config #3 | 10001 | SPS Config #6, SPS Config #7 |
| 00010 | SPS Config #2, SPS Config #4 | 10010 | SPS Config #7 |
| 00011 | SPS Config #1 | 10011 | SPS Config #6 |
| 00100 | SPS Config #1 to SPS Config #3 | 10100 | |
| 00101 | SPS Config #3, SPS Config #4 | 10101 | |
| 00110 | SPS Config #4 | 10110 | |
| 00111 | SPS Config #2 | 10111 | |
| 01000 | SPS Config #1, SPS Config #2 | 11000 | |
| 01001 | SPS Config #3 | 11001 | |
| 01010 | SPS Config #2, SPS Config #3 | 11010 | |
| 01011 | SPS Config #1, SPS Config #4 | 11011 | |
| 01100 | SPS Config #1 to SPS Config #4 | 11100 | |
| 01101 | SPS Config #2 to SPS Config #4 | 11101 | |
| 01110 | SPS Config #1, SPS Config #2, SPS Config #4 | 11110 | |
| 01111 | SPS Config #1, SPS Config #3, SPS Config #4 | 11111 | |

FIG. 2A

| SPS deactivation state entry | SPS configurations in a deactivation state in SPS deactivation state list | SPS configurations in a deactivation state in additional SPS deactivation state list |
|---|---|---|
| 0000 | SPS Config #0, SPS Config #2 | SPS Config #1 |
| 0001 | SPS Config #4, SPS Config #6 | SPS Config #3, SPS Config #5 |
| 0010 | SPS Config #0 | SPS Config #3 |
| 0011 | SPS Config #2 | SPS Config #5, SPS Config #7 |
| 0100 | SPS Config #4 | SPS Config #5 |
| 0101 | SPS Config #6 | SPS Config #7 |
| 0110 | | SPS Config #3, SPS Config #7 |
| 0111 | | SPS Config #3, SPS Config #5, SPS Config #7 |
| 1000 | | |
| 1001 | | |
| 1010 | | |
| 1011 | | |
| 1100 | | |
| 1101 | | |
| 1110 | | |
| 1111 | | |

FIG. 3A

METHODS AND APPARATUS FOR SEMI-PERSISTENT SCHEDULING (SPS) DOWNLINK TRANSMISSION

CROSS REFERENCE TO RELATED APPLICATIONS

This application is a national phase entry of International Application No. PCT/CN2020/120160 filed Oct. 10, 2020, which is incorporated by reference in its entirety.

TECHNICAL FIELD

Embodiments of the present disclosure are related to wireless communication technologies, and more particularly, related to methods and apparatuses for semi-persistent scheduling (SPS) downlink transmission in, for example, multiple downlink control information (DCI) based multiple transmit-receive points (TRP) scenarios.

BACKGROUND

In New Radio (NR) Rel-16, an important feature in enhanced Ultra-Reliable and Low Latency Communications (eURLLC) is that multiple SPS physical downlink shared channels (PDSCHs) can be configured in an active bandwidth part (BWP) of a serving cell. DCI jointly deactivating two or more SPS PDSCH configurations is also supported. Moreover, both multi-DCI based and single-DCI based multi-TRP scenarios are supported in Rel-16. A flexible joint deactivation mechanism is desired for multi-TRP scenarios.

SUMMARY OF THE DISCLOSURE

Embodiments of the present disclosure provide at least improved DCI joint deactivation of SPS configurations in multi-DCI based multi-TRP scenarios.

According to some embodiments of the present disclosure, a method may include: receiving a set of first DCI on at least one control resource set (CORESET) for activating a set of SPS configurations, wherein each CORESET is configured with a CORESETPoolIndex, and each of the set of first DCI activates a corresponding one of the set of SPS configurations; and receiving a set of second DCI on at least one first CORESET configured with a first CORESET-PoolIndex, wherein each second DCI only deactivates first one or more SPS configurations of the set of SPS configurations activated by first one or more first DCI received on one or more CORESETs configured with the first CORE-SETPoolIndex.

In an embodiment of the present disclosure, the method may further include receiving an SPS deactivation state list, wherein each SPS deactivation state corresponding to an entry in the SPS deactivation state list includes one or more SPS configurations.

In an embodiment of the present disclosure, a first subset of SPS configurations included in a first set of entries in the SPS deactivation state list are activated by a first subset of first DCI received on the one or more CORESETs configured with the first CORESETPoolIndex, and a second subset of SPS configurations included in a second set of entries in the SPS deactivation state list are activated by a second subset of first DCI received on one or more CORESETs configured with a second CORESETPoolIndex. The second DCI may include a first hybrid automatic repeat request (HARQ) process number, the first one or more SPS configurations deactivated by the second DCI received on the first CORESET configured with the first CORESETPoolIndex are included in an SPS deactivation state corresponding to a first entry of the first set of entries in the SPS deactivation state list, and an entry index of the first entry may have a first predefined relation with the first HARQ process number. For example, the entry index of the first entry may equal the first HARQ process number.

In an embodiment of the present disclosure, the method may further include receiving a third DCI on a second CORESET configured with the second CORESETPoolIndex, wherein the third DCI only deactivates second one or more SPS configurations activated by second one or more of the second subset of first DCI received on one or more CORESETs configured with the second CORESETPoolIndex, wherein the third DCI may include a second HARQ process number, the second one or more SPS configurations deactivated by the third DCI are included in an SPS deactivation state corresponding to a second entry of the second set of entries in the SPS deactivation state list, and an entry index of the second entry may have a second predefined relation with the second HARQ process number. For example, the entry index of the second entry equals the second HARQ process number plus floor(M/2), floor( ) is a round down function, and M is a maximum number of entries in the SPS deactivation state list.

In an embodiment of the present disclosure, the method may further include receiving an additional SPS deactivation state list, wherein each SPS deactivation state corresponding to an entry in the SPS deactivation state list may include first at least one SPS configuration activated by first at least one of the set of first DCI received on one or more CORESETs configured with the first CORESETPoolIndex, and each SPS deactivation state corresponding to an entry in the additional SPS deactivation state list may include second at least one SPS configuration activated by second at least one of the set of first DCI received on one or more CORESETs configured with a second CORESETPoolIndex. The second DCI may include a first HARQ process number, the first one or more SPS configurations deactivated by the second DCI received on the first CORESET configured with the first CORESET-PoolIndex are included in an SPS deactivation state corresponding to a first entry in the SPS deactivation state list, and an entry index of the first entry may correspond to the first HARQ process number.

In an embodiment of the present disclosure, the method may further include receiving a third DCI on a second CORESET configured with the second CORESETPoolIndex, wherein the third DCI only deactivates second one or more SPS configurations activated by second one or more of the set of first DCI received on one or more CORESETs associated with the second CORESETPoolIndex, wherein the third DCI may include a second HARQ process number, the second one or more SPS configurations deactivated by the third DCI are included in an SPS deactivation state corresponding to a second entry in the additional SPS deactivation state list, and an entry index of the second entry may correspond to the second HARQ process number.

According to some embodiments of the present disclosure, a method may include: transmitting a set of first DCI on at least one control resource set (CORESET) for activating a set of SPS configurations, wherein each CORESET is configured with a CORESETPoolIndex, and each of the set of first DCI activates a corresponding one of the set of SPS configurations; and transmitting a set of second DCI on at least one first CORESET configured with a first CORESET-PoolIndex, wherein each second DCI only deactivates first one or more SPS configurations of the set of SPS configurations activated by first one or more first DCI transmitted on one or more CORESETs configured with the first CORE-SETPoolIndex.

In an embodiment of the present disclosure, the method may further include transmitting an SPS deactivation state list, wherein each SPS deactivation state corresponding to an entry in the SPS deactivation state list includes one or more SPS configurations.

In an embodiment of the present disclosure, a first subset of SPS configurations included in a first set of entries in the SPS deactivation state list are activated by a first subset of first DCI transmitted on the one or more CORESETs configured with the first CORESETPoolIndex, and a second subset of SPS configurations included in a second set of entries in the SPS deactivation state list are activated by a second subset of first DCI transmitted on one or more CORESETs configured with a second CORESETPoolIndex. The second DCI may include a first hybrid automatic repeat request (HARQ) process number, the first one or more SPS configurations deactivated by the second DCI transmitted on the first CORESET configured with the first CORESET-PoolIndex are included in an SPS deactivation state corresponding to a first entry of the first set of entries in the SPS deactivation state list, and an entry index of the first entry may have a first predefined relation with the first HARQ process number. For example, the entry index of the first entry may equal the first HARQ process number.

In an embodiment of the present disclosure, the method may further include transmitting a third DCI on a second CORESET configured with the second CORESETPoolIn-dex, wherein the third DCI only deactivates second one or more SPS configurations activated by second one or more of the second subset of first DCI transmitted on one or more CORESETs configured with the second CORESETPoolIn-dex, wherein the third DCI may include a second HARQ process number, the second one or more SPS configurations deactivated by the third DCI are included in an SPS deactivation state corresponding to a second entry of the second set of entries in the SPS deactivation state list, and an entry index of the second entry may have a second predefined relation with the second HARQ process number. For example, the entry index of the second entry equals the second HARQ process number plus floor(M/2), floor( ) is a round down function, and M is a maximum number of entries in the SPS deactivation state list.

In an embodiment of the present disclosure, the method may further include transmitting an additional SPS deacti-vation state list, wherein each SPS deactivation state corre-sponding to an entry in the SPS deactivation state list may include first at least one SPS configuration activated by first at least one of the set of first DCI transmitted on one or more CORESETs configured with the first CORESETPoolIndex, and each SPS deactivation state corresponding to an entry in the additional SPS deactivation state list may include second at least one SPS configuration activated by second at least one of the set of first DCI transmitted on one or more CORESETs configured with a second CORESETPoolIndex. The second DCI may include a first HARQ process number, the first one or more SPS configurations deactivated by the second DCI transmitted on the first CORESET configured with the first CORESETPoolIndex are included in an SPS deactivation state corresponding to a first entry in the SPS deactivation state list, and an entry index of the first entry may correspond to the first HARQ process number.

In an embodiment of the present disclosure, the method may further include transmitting a third DCI on a second CORESET configured with the second CORESETPoolIndex, wherein the third DCI only deactivates second one or more SPS configurations activated by second one or more of the set of first DCI transmitted on one or more CORESETs associated with the second CORESETPoolIndex, wherein the third DCI may include a second HARQ process number, the second one or more SPS configurations deactivated by the third DCI are included in an SPS deactivation state corresponding to a second entry in the additional SPS deactivation state list, and an entry index of the second entry may correspond to the second HARQ process number.

According to other embodiments of the present disclo-sure, an apparatus may include: at least one non-transitory computer-readable medium having stored thereon computer executable instructions; at least one receiving circuitry; at least one transmitting circuitry; and at least one processor coupled to the at least one non-transitory computer-readable medium, the at least one receiving circuitry and the at least one transmitting circuitry. The computer executable instruc-tions may cause the at least processor to implement a method according to any embodiment of the present disclosure.

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the present disclosure can be obtained, a descrip-tion of the present disclosure is rendered by reference to specific embodiments thereof which are illustrated in the appended drawings. These drawings depict only exemplary embodiments of the present disclosure and are not therefore intended to limit the scope of the present disclosure.

FIG. 2A illustrates an exemplary configuration of an SPS deactivation state list according to some embodiments of the present disclosure;

FIG. 3A illustrates exemplary configurations of an SPS deactivation state list and an additional SPS deactivation state list according to some embodiments of the present disclosure;

DETAILED DESCRIPTION

The detailed description of the appended drawings is intended as a description of the currently preferred embodi-ments of the present disclosure and is not intended to represent the only form in which the present disclosure may be practiced. It is to be understood that the same or equiva-lent functions may be accomplished by different embodi-ments that are intended to be encompassed within the spirit and scope of the present disclosure.

In the following description, numerous specific details are provided, such as examples of programming, software modules, network transactions, database structures, hardware modules, hardware circuits, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference will now be made in detail to some embodiments of the present disclosure, examples of which are illustrated in the accompanying drawings. To facilitate understanding, embodiments are provided under specific network architecture and new service scenarios, such as 3rd Generation Partnership Project (3GPP) 5G, 3GPP Long Term Evolution (LTE) and so on. Persons skilled in the art know very well that, with the development of network architecture and new service scenarios, the embodiments in the present disclosure are also applicable to similar technical problems; and moreover, the terminologies recited in the present disclosure may change, which should not affect the principle of the present disclosure.

A wireless communication system can have one or more TRPs (or panels). A TRP can function as a base station. The TRPs can communicate with each other by backhaul link. Such backhaul link may be an ideal backhaul link or a non-ideal backhaul link. Latency of the ideal backhaul link may be deemed as zero, and latency of the non-ideal backhaul link may be tens of milliseconds and much larger, e.g. on the order of tens of milliseconds, than that of the ideal backhaul link.

One single TRP can be used to serve one or more user equipments (UEs) under control of a base station. A TRP can represent various communication devices. A base station can also have one or more TRPs. For example, in some application scenarios, in a Coordinated Multi-Point (CoMP) scenario, a TRP can represent a base station. Persons skilled in the art should understand that as the 3GPP and the communication technology develop, the terminologies recited in the specification may change, which should not affect the scope of the present disclosure.

Figure 1:
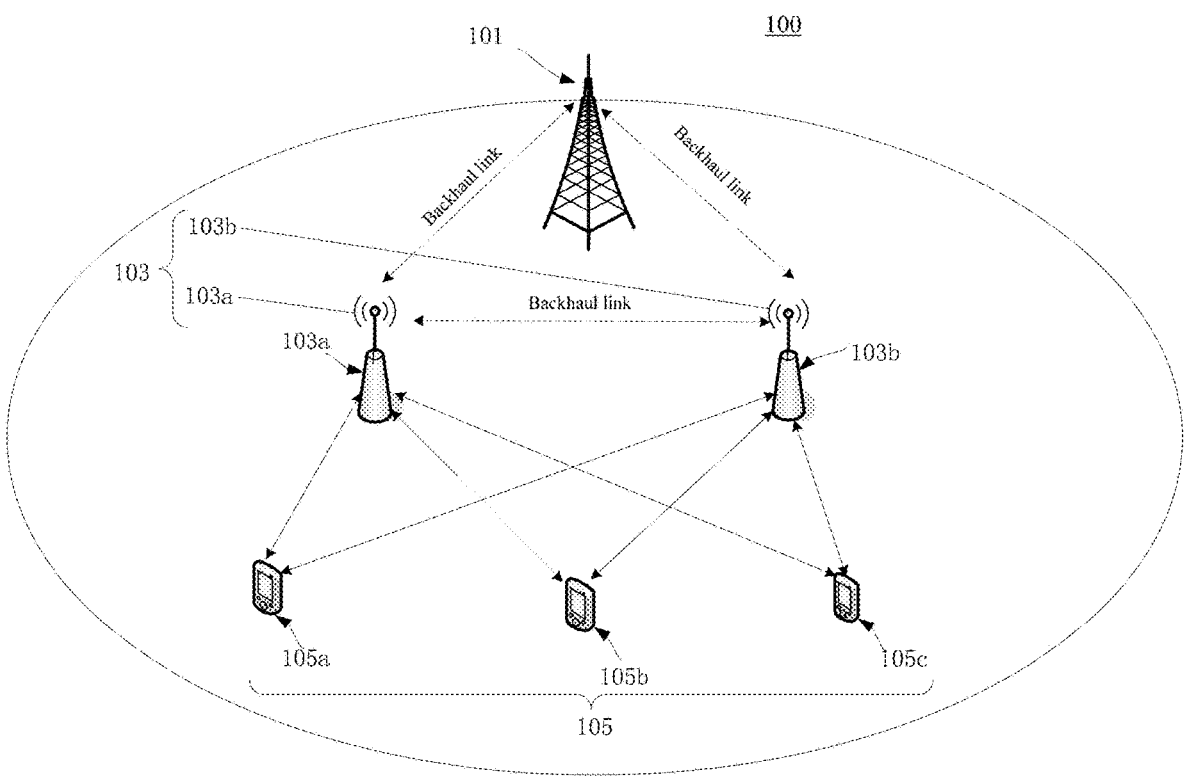
FIG. 1 illustrates an exemplary schematic diagram of a wireless communication system according to some embodi-ments of the present disclosure.

FIG. 1 illustrates an exemplary schematic diagram of a wireless communication system 100 according to some embodiments of the present disclosure.

Referring to FIG. 1, a wireless communication system 100 may include a base station 101, TRPs 103 (e.g., TRP 103a and TRP 103b), and UEs 105 (e.g., UE 105a, UE 105b, and UE 105c). Although only one base station 101, two TRPs 103 and three UEs 105 are shown for simplicity, it should be noted that the wireless communication system 100 may include more base stations, more or fewer TRPs or UEs, or other communication device(s) or apparatus in accordance with some other embodiments of the present disclosure.

The wireless communication system 100 can be compatible with any type of network that is capable of sending and receiving wireless communication signals. For example, the wireless communication system 100 can be compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

The base station 101 can be referred to as an access point, an access terminal, a base, a macro cell, a node-B, an enhanced node B (eNB), a gNB, a home node-B, a relay node, or a device, or described using other terminology used in the art. The UE 105a, UE 105b, or UE 105c may include, for example, but is not limited to, a computing device, a wearable device, a mobile device, an IoT (Internet of Things) device, a vehicle, etc. Moreover, the UE 105a, UE 105b, or UE 105c may be referred to as a subscriber unit, a mobile, a mobile station, a user, a terminal, a mobile terminal, a wireless terminal, a subscriber station, a user terminal, or a device, or described using other terminology used in the art. The UE 105a, UE 105b, and UE 105c may include same, similar, or different devices in various embodiments of the present disclosure.

The TRPs 103, for example, the TRP 103a and the TRP 103b, can communicate with the base station 101 via, for example, a backhaul link. Each of the TRPs 103 can serve some or all of the UEs 105. As shown in FIG. 1, the TRP 103a can serve some UEs (e.g., the UE 105a, the UE 105b, and the UE 105c) within a serving area or region (e.g., a cell or a cell sector). The TRP 103b can serve some UEs (e.g., the UE 105a, the UE 105b, and the UE 105c) within a serving area or region (e.g., a cell or a cell sector). The TRP 103a and the TRP 103b can communicate to each other via, for example, a backhaul link.

The base station 101 may configure SPS PDSCHs for the UEs 105. For example, the base station 101 may transmit an SPS configuration for PDSCH to a UE (e.g., the UE 105a, UE 105b, or UE 105c) via higher layer signaling (e.g., radio resource control (RRC) signaling). Then the base station 101 may transmit a physical downlink control channel (PDCCH) carrying a DCI to activate the configured SPS PDSCH. After the activation, the UE can periodically receive PDSCH(s) on configured resource(s) according to parameters of the SPS configuration without any additional DCI, until receiving a PDCCH carrying a DCI to deactivate the configured SPS PDSCH. After the deactivation (also referred to as "release"), the UE does not expect to receive PDSCH(s) on the configured SPS resource(s).

In NR Rel-16, multiple SPS PDSCHs can be configured in an active BWP of a serving cell. A single DCI may jointly deactivate two or more SPS PDSCH configurations. For example, the base station 101 may configure one or more SPS deactivation states, and each SPS deactivation state may include one or more SPS PDSCH configurations. The base station 101 may transmit a DCI to deactivate all the one or more SPS PDSCH configurations in a SPS deactivation state.

In multi-TRP scenarios, PDSCHs transmitted from the base station 101 may be transmitted from different TRPs. For example, some PDSCHs may be transmitted from the TRP 103a, and some PDSCHs may be transmitted from the TRP 103b. In some implementations, a single DCI can be used to schedule a PDSCH transmitted from both the TRP 103a and the TRP 103b, which is referred to as a single-DCI based multi-TRP scenario. In other implementations, separate DCIs can be used to schedule the separate PDSCH(s) transmitted from the TRP 103a and that transmitted from the TRP 103b, respectively, which is referred to as a multi-DCI based multi-TRP scenario. For example, a DCI from the TRP 103a can schedule a PDSCH transmitted from the TRP 103a, and a DCI from the TRP 103b can schedule another PDSCH transmitted from the TRP 103b. In some embodiments of the present disclosure, an index (e.g., CORESET-PoolIndex) can be specific to a TRP index. That is, the DCI(s) from the TRP 103a can be transmitted on CORESET(s) configured with a first CORESETPoolIndex (e.g. CORESETPoolIndex #0), while the DCI(s) from the TRP 103b can be transmitted on CORESET(s) configured with a second CORESETPoolIndex (e.g. CORESETPoolIndex #1) different from the first CORESETPoolIndex. Persons skilled in the art should understand that as the 3GPP and the communication technology develop, the terminologies recited in the specification may change, which should not affect the scope of the present disclosure.

When a DCI jointly deactivating two or more SPS PDSCH configurations is applied in a multi-DCI based multi-TRP scenario, the DCI from a TRP may deactivate SPS PDSCH configuration(s) which was(were) activated by DCI(s) from another TRP as the SPS deactivation state configured by the base station may include SPS PDSCH configurations from different TRPs. However, at least for a non-ideal backhaul link between the TRPs, a UE may expect that an SPS PDSCH configuration should be deactivated by a DCI transmitted from the same TRP as the DCI activating the SPS PDSCH configuration.

In accordance with some embodiments of the present disclosure, to prevent a DCI transmitted from a TRP from deactivating SPS PSCH configuration(s) from another TRP when applying joint deactivation of SPS PDSCH configurations in a multi-DCI based multi-TRP scenario, a limitation is applied to the SPS deactivation state(s) configured by the base station. Namely, each SPS deactivation state should only include SPS PDSCH configuration(s) activated by DCI(s) transmitted from the same TRP (i.e., transmitted on CORESET(s) configured with the same CORESETPoolIndex), and a DCI deactivating the SPS PDSCH configuration(s) in an SPS deactivation state should be transmitted from the same TRP (i.e., transmitted on a CORESET configured with the same CORESETPoolIndex) as the DCI(s) activating the SPS PDSCH configuration(s).

The base station 101 can configure an SPS deactivation state list (e.g., SPS-ReleaseStateList in Rel-16) to a UE (e.g., the UE 105a, UE 105b, or UE 105c). Each entry in the SPS deactivation state list may be an SPS deactivation state configured by the base station 101 or a null entry. A value of a HARQ process number (HPN) field in a deactivation DCI can be used to indicate a corresponding entry in the SPS deactivation state list to deactivate the SPS PDSCH configuration(s) included in the SPS deactivation state corresponding to that entry. In the case that the HPN field has up to four (4) bits, a maximum of sixteen (16) SPS deactivation states can be indicated in a DCI, and the SPS deactivation state list can include a maximum of sixteen (16) SPS deactivation states accordingly. When the aforementioned limitation is applied, due to the limited number of SPS deactivation states, the flexibility of the system may be reduced compared to the case without the aforementioned limitation.

Embodiments of the present disclosure may provide methods to increase the flexibility under the aforementioned limitation, which will be specifically described below.

Figure 2:
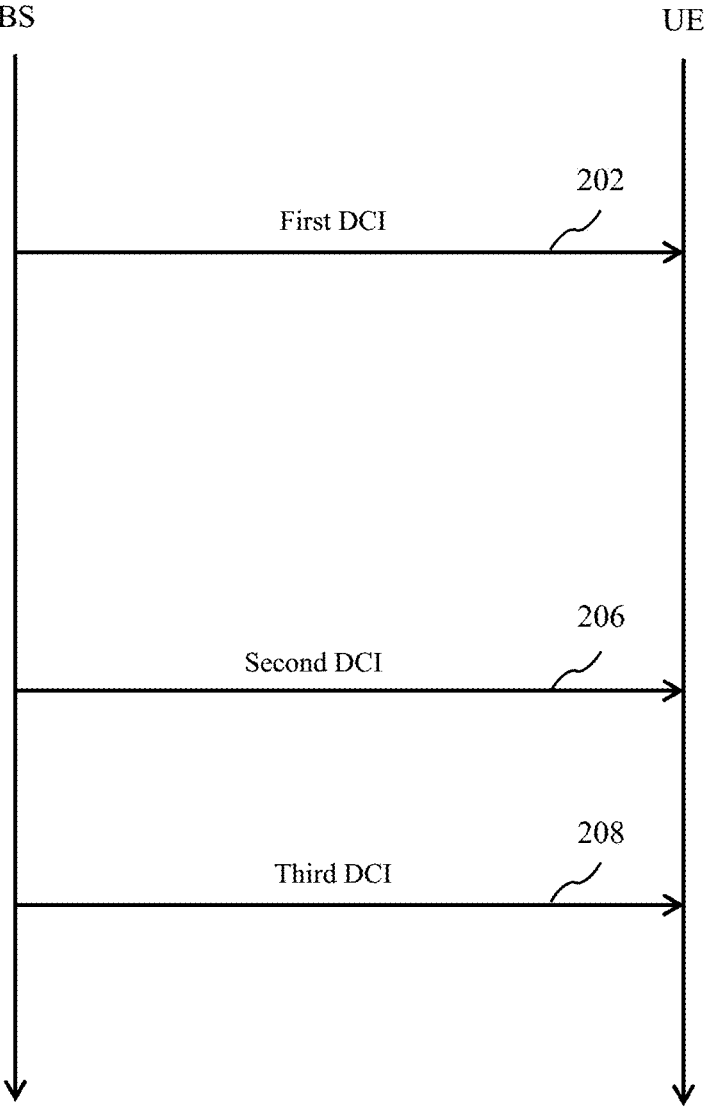
FIG. 2 illustrates a flow chart of an exemplary method for activating and deactivating SPS configuration(s) according to some embodiments of the present disclosure.

FIG. 2 illustrates a flow chart of an exemplary method for activating and deactivating SPS configuration(s) according to some embodiments of the present disclosure.

As shown in FIG. 2, a base station (BS), e.g., the base station 101 in FIG. 1, may transmit a set of first DCI to a UE, e.g., the UE 105a, UE 105b, or UE 105c, at step 202. The set of first DCI is transmitted on at least one CORESET for activating a set of SPS configurations (e.g., SPS PDSCH configurations) for the UE. Although not shown in FIG. 2 for simplicity, it should be understood that the BS provides parameters of SPS configurations including the set of SPS configurations to the UE via higher layer signaling before step 202, and transmits PDSCH(s) to the UE according to the SPS configuration(s) activated by the set of first DCI after step 202. Each CORESET is configured with a CORESETPoolIndex, and each first DCI may activate one SPS configuration of the set of SPS configurations. Since the CORESETPoolIndex is specific to the TRP index, DCIs from the same TRP are transmitted on CORESET(s) configured with the same CORESETPoolIndex.

According to some embodiments of the present disclosure, the parameters of SPS configurations provided by the BS may include an SPS deactivation state list configured to the UE. Each entry in the SPS deactivation state list may be an SPS deactivation state or a null entry. Each SPS deactivation state corresponding to an entry in the SPS deactivation state list may include one or more SPS configurations. According to the aforementioned limitation, the one or more SPS configurations included in an SPS deactivation state are associated with the same TRP, i.e., they are activated by DCI(s) transmitted on CORESET(s) configured with the same CORESETPoolIndex.

In a multi-DCI based multi-TRP scenario, the SPS deactivation state list may include SPS deactivation states associated with different TRPs, respectively. According to some embodiments of the present disclosure, the SPS deactivation state list can be configured such that different sets of entries correspond to SPS deactivation states associated with different TRPs. For example, a first subset of SPS configurations included in a first set of entries in the SPS deactivation state list are activated by a first subset of first DCI transmitted on CORESET(s) configured with a first CORESETPoolIndex, and a second subset of SPS configurations included in a second set of entries in the SPS deactivation state list are activated by a second subset of first DCI transmitted on CORESET(s) configured with a second CORESETPoolIndex.

As a non-limiting example, the BS may configure SPS deactivation state(s) associated with a first TRP in the first floor(M/2) entries in the SPS deactivation state list, and configure SPS deactivation state(s) associated with a second TRP in the remaining entries, where floor( ) is a round down function, and M is a maximum number of entries in the SPS deactivation state list.

For example, it is supposed that eight SPS PDSCH configurations (SPS Config #0 to SPS Config #7) are provided in a BWP. SPS Config #0 with priority of 0 and SPS Config #1 to SPS Config #4 with priority of 1 are associated with TRP #0 and activated by DCIs transmitted on CORESETs configured with CORESETPoolIndex #0. SPS Config #5 with priority of 0 and SPS Config #6 to SPS Config #7 with priority of 1 are associated with TRP #1 and activated by DCIs transmitted on CORESETs configured with CORESETPoolIndex #1. An SPS deactivation state list including thirty-two (32) entries can be configured as shown in FIG. 2A. As shown in FIG. 2A, SPS deactivation states associated with TRP #0 are configured in the first sixteen (16) entries in the list and SPS deactivation states associated with TRP #1 are configured in the last sixteen (16) entries. In the example shown in FIG. 2A, the last twelve (12) entries are null entries which do not correspond to any SPS deactivation state. In other embodiments of the present disclosure, the first sixteen (16) entries may also include one or more null entries.

As another example, the BS may configure SPS deactivation state(s) associated with a first TRP in the odd entries in the SPS deactivation state list, and configure SPS deactivation state(s) associated with a second TRP in the even entries. Persons skilled in the art would understand that various configurations of the SPS deactivation state list may be made without departing from the spirit and scope of the disclosure.

Referring back to FIG. 2, the BS may transmit at least one second DCI to the UE at step 206. The at least one second DCI is transmitted on at least one first CORESET configured with a first CORESETPoolIndex, and each second DCI only deactivates one or more SPS configurations activated by DCI(s) transmitted on CORESET(s) configured with the first CORESETPoolIndex due to the aforementioned limitation. The BS may further transmit at least one third DCI to the UE at step 208. The at least one third DCI is transmitted on at least one second CORESET configured with a second CORESETPoolIndex, and each third DCI only deactivates one or more SPS configurations activated by DCI(s) transmitted on CORESET(s) configured with the second CORESETPoolIndex due to the aforementioned limitation. The second CORESETPoolIndex is different from the first CORESETPoolIndex. That is, the at least one second DCI and the at least one third DCI are transmitted from different TRPs. Although FIG. 2 shows that the at least one second DCI is transmitted prior to the at least one third DCI, it should be understood that the transmitting order is not limiting. For example, the at least one second DCI and the at least one third DCI can be transmitted alternately or in any other order.

According to some embodiments of the present disclosure, the SPS deactivation state(s) including the SPS configuration(s) activated by DCI(s) transmitted on CORESET(s) configured with the first CORESETPoolIndex are configured in a first set of entries in the SPS deactivation state list, and the SPS deactivation state(s) including the SPS configuration(s) activated by DCI(s) transmitted on CORESET(s) configured with the second CORESETPoolIndex are configured in a second set of entries in the SPS deactivation state list. The value of the HPN field (also referred to as HPN) in each second DCI may indicate an entry in the first set of entries, and the HPN in each third DCI may indicate an entry in the second set of entries. That is, the same HPN in a DCI transmitted on a CORESET configured with a different CORESETPoolIndex may indicate a different entry in the SPS deactivation state list. Depending on the configuration of the SPS deactivation state list, the HPN in the second DCI may have a predefined relation with the entry index of the entry indicated by it, and the HPN in the third DCI may have a different predefined relation with the entry index of the entry indicated by it.

For example, when the SPS deactivation state list is configured such that SPS deactivation state(s) associated with the first CORESETPoolIndex are in the first floor(M/2) entries in the SPS deactivation state list, and SPS deactivation state(s) associated with the second CORESETPoolIndex are in the remaining entries, where floor( ) is a round down function, and M is a maximum number of entries in the SPS deactivation state list, the entry index of the entry indicated by the HPN in the second DCI may equal the HPN in the second DCI, and the entry index of the entry indicated by the HPN in the third DCI may equal the HPN in the third DCI plus floor(M/2).

Taking the SPS deactivation state list shown in FIG. 2A as an example, when the UE receives a DCI for deactivation on a CORESET configured with CORESETPoolIndex #0 and the HPN in the DCI equals 1, it means that the SPS configurations (SPS Config #1 and SPS Config #3) included in the SPS deactivation state corresponding to the entry with an index equal to 1 (i.e., "00001") are deactivated; when the UE receives a DCI for deactivation on a CORESET configured with CORESETPoolIndex #1 and the HPN in the DCI equals 1, it means that the SPS configurations (SPS Config #6 and SPS Config #7) included in the SPS deactivation state corresponding to the entry with an index equal to 1 plus floor(32/2) (i.e., "10001") are deactivated.

As can be seen, although the HPN in a DCI which has up to four (4) bits can only indicate a maximum of sixteen (16) SPS deactivation states, the SPS deactivation state list can include a maximum of thirty-two (32) SPS deactivation states in the above example, which can increase the flexibility of the system due to consideration of the CORESETPoolIndex.

Figure 3:
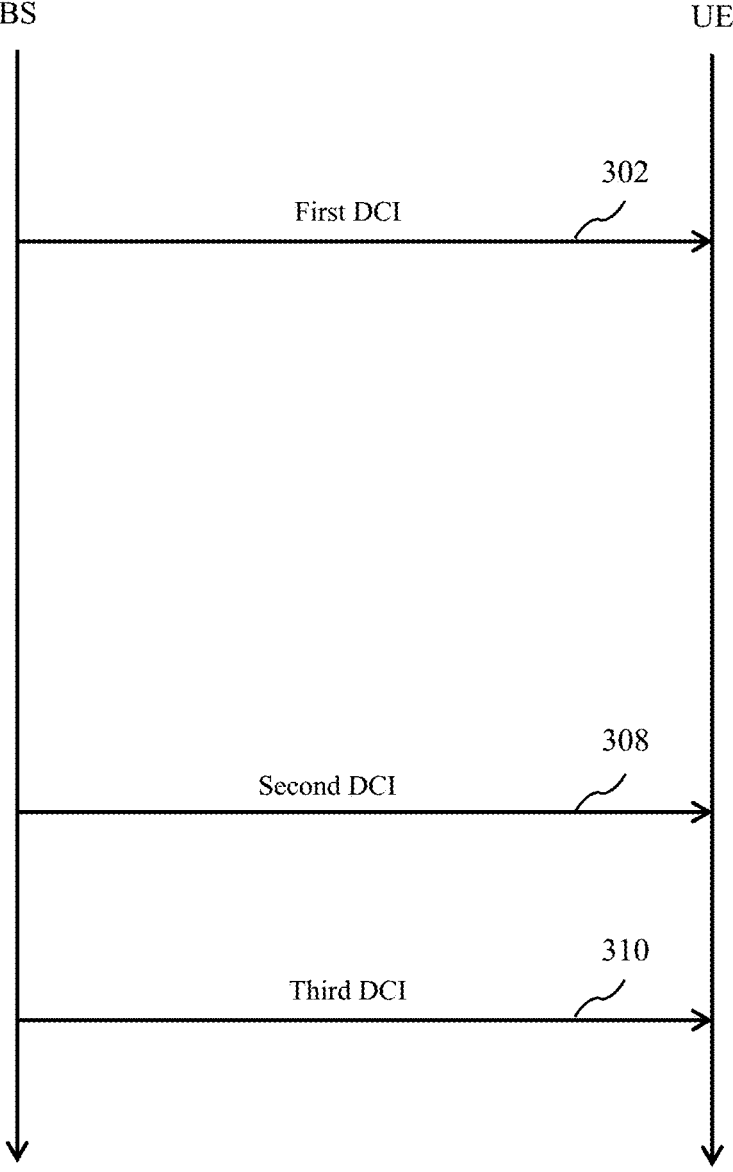
FIG. 3 illustrates a flow chart of another exemplary method for activating and deactivating SPS configuration(s) according to some embodiments of the present disclosure.

FIG. 3 illustrates a flow chart of another exemplary method for activating and deactivating SPS configuration(s) according to some embodiments of the present disclosure.

As shown in FIG. 3, a BS, e.g., the base station 101 in FIG. 1, may transmit a set of first DCI to a UE, e.g., the UE 105a, UE 105b, or UE 105c, at step 302. The set of first DCI is transmitted on at least one CORESET for activating a set of SPS configurations (e.g., SPS PDSCH configurations) for the UE. Although not shown in FIG. 3 for simplicity, it should be understood that the BS provides parameters of SPS configurations including the set of SPS configurations to the UE via higher layer signaling before step 302, and transmits PDSCH(s) to the UE according to the SPS configuration(s) activated by the set of first DCI after step 302. Each CORESET is configured with a CORESETPoolIndex, and each first DCI may activate at least an SPS configuration of the set of SPS configurations. Since the CORESETPoolIndex is specific to the TRP index, DCIs from the same TRP are transmitted on CORESET(s) configured with the same CORESETPoolIndex.

According to some embodiments of the present disclosure, the parameters of SPS configurations provided by the BS may include an SPS deactivation state list configured to the UE. Each entry in the SPS deactivation state list may be an SPS deactivation state or a null entry. Each SPS deactivation state corresponding to an entry in the SPS deactivation state list may include one or more SPS configurations. According to the aforementioned limitation, the one or more SPS configurations included in an SPS deactivation state in the SPS deactivation state list are associated with the same TRP, i.e., they are activated by DCI(s) transmitted on CORESET(s) configured with the same CORESETPoolIndex.

According to some embodiments of the present disclosure, besides the SPS deactivation state list, the parameters of SPS configurations provided by the BS may further include an additional SPS deactivation state list configured to the UE. Each entry in the additional SPS deactivation state list may be an SPS deactivation state or a null entry. Each SPS deactivation state corresponding to an entry in the additional SPS deactivation state list may include one or more SPS configurations. According to the aforementioned limitation, the one or more SPS configurations included in an SPS deactivation state in the additional SPS deactivation state list are associated with the same TRP, i.e., they are activated by DCI(s) transmitted on CORESET(s) configured with the same CORESETPoolIndex.

According to some embodiments of the present disclosure, the SPS deactivation state list and the additional SPS deactivation state list can be configured such that the deactivation state(s) in the SPS deactivation state list are associated with different TRPs from the deactivation state(s) in the additional SPS deactivation state list. For example, the SPS configuration(s) included in any SPS deactivation state corresponding to an entry in the SPS deactivation state list are activated by DCI(s) transmitted on CORESET(s) configured with a first CORESETPoolIndex, and the SPS configuration(s) included in any SPS deactivation state corresponding to an entry in the additional SPS deactivation state list are activated by DCI(s) transmitted on CORESET(s) configured with a second CORESETPoolIndex.

As a non-limiting example, it is supposed that eight SPS PDSCH configurations (SPS Config #0 to SPS Config #7) are provided in a BWP. SPS Config #0 and SPS Config #2 with priority 0 and SPS Config #4 and SPS Config #6 with priority 1 are associated with TRP #0 and activated by DCIs transmitted on CORESETs configured with CORESET-PoolIndex #0. SPS Config #1 with priority 0 and SPS Config #3, SPS Config #5, and SPS Config #7 with priority 1 are associated with TRP #1 and activated by DCIs transmitted on CORESETs configured with CORESETPoolIndex #1. An SPS deactivation state list and an additional SPS deactivation state list each including sixteen (16) entries can be configured as shown in FIG. 3A. As shown in FIG. 3A, SPS deactivation states associated with TRP #0 are configured in the SPS deactivation state list, and SPS deactivation states associated with TRP #1 are configured in the additional SPS deactivation state list.

Persons skilled in the art would understand that more additional SPS deactivation state lists can be used when more TRPs are used, which would not depart from the spirit and scope of the disclosure.

Referring back to FIG. 3, the BS may transmit at least one second DCI to the UE at step 308. The at least one second DCI is transmitted on at least one first CORESET configured with a first CORESETPoolIndex, and each second DCI only deactivates one or more SPS configurations activated by DCI(s) transmitted on CORESET(s) configured with the first CORESETPoolIndex due to the aforementioned limitation. The BS may further transmit at least one third DCI to the UE at step 310. The at least one third DCI is transmitted on at least one second CORESET configured with a second CORESETPoolIndex, and each third DCI only deactivates one or more SPS configurations activated by DCI(s) transmitted on CORESET(s) configured with the second CORE-SETPoolIndex due to the aforementioned limitation. The second CORESETPoolIndex is different from the first CORESETPoolIndex. That is, the at least one second DCI and the at least one third DCI are transmitted from different TRPs. Although FIG. 3 shows that the at least one second DCI is transmitted prior to the at least one third DCI, it should be understood that the transmitting order is not limiting. For example, the at least one second DCI and the at least one third DCI can be transmitted alternately or in any other order.

According to some embodiments of the present disclosure, the SPS deactivation state(s) including the SPS configuration(s) activated by DCI(s) transmitted on CORESET(s) configured with the first CORESETPoolIndex are configured in the SPS deactivation state list, and the SPS deactivation state(s) including the SPS configuration(s) activated by DCI(s) transmitted on CORESET(s) configured with the second CORESETPoolIndex are configured in the additional SPS deactivation state list. The HPN in each second DCI may indicate an entry in the SPS deactivation state list, and the HPN in each third DCI may indicate an entry in the additional SPS deactivation state list. That is, the same HPN in a DCI transmitted on a CORESET configured with a different CORESETPoolIndex may indicate an entry in a different SPS deactivation state list.

Taking the SPS deactivation state list and the additional SPS deactivation state list shown in FIG. 3A as an example, when the UE receives a DCI for deactivation on a CORE-SET configured with CORESETPoolIndex #0 and the HPN in the DCI equals 1, it means that the SPS configurations (SPS Config #4 and SPS Config #6) included in the SPS deactivation state corresponding to the entry with an index equal to 1 (i.e., "0001") are deactivated; when the UE receives a DCI for deactivation on a CORESET configured with CORESETPoolIndex #1 and the HPN in the DCI equals 1, it means that the SPS configurations (SPS Config #3 and SPS Config #5) included in the additional SPS deactivation state corresponding to the entry with an index equal to 1 (i.e., "0001") are deactivated.

As can be seen, although the HPN in a DCI which has up to four (4) bits can only indicate a maximum of sixteen (16) SPS deactivation states, the SPS deactivation state list and the additional SPS deactivation state list totally can include a maximum of thirty-two (32) SPS deactivation states in the above example, which can increase the flexibility of the system due to consideration of the CORESETPoolIndex.

Figure 4:
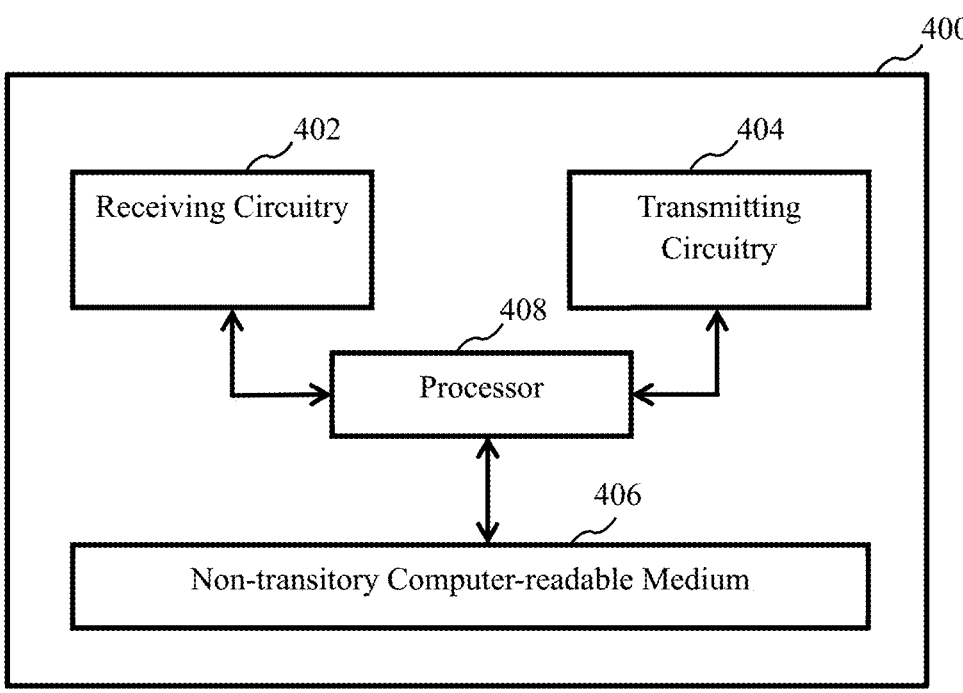
FIG. 4 illustrates an exemplary block diagram of an apparatus according to some embodiments of the present disclosure.

FIG. 4 illustrates an exemplary block diagram of an apparatus 400 according to some embodiments of the present disclosure. In some embodiments of the present disclosure, the apparatus 400 may be or include a BS (e.g., the base station 101) or other devices having similar functionality. In some embodiments, the apparatus 400 can be configured to perform the method illustrated in FIG. 2 or 3.

As shown in FIG. 4, the apparatus 400 may include at least one receiving circuitry 402, at least one transmitting circuitry 404, at least one non-transitory computer-readable medium 406, and at least one processor 408 coupled to the at least one receiving circuitry 402, the at least one transmitting circuitry 404, the at least one non-transitory computer-readable medium 406. While shown to be coupled to each other via the at least one processor 408 in the example of FIG. 4, the at least one receiving circuitry 402, the at least one transmitting circuitry 404, the at least one non-transitory computer-readable medium 406, and the at least one processor 408 may be coupled to one another in various arrangements. For example, the at least one receiving circuitry 402, the at least one transmitting circuitry 404, the at least one non-transitory computer-readable medium 406, and the at least one processor 408 may be coupled to each other via one or more local buses (not shown for simplicity).

Although in FIG. 4, elements such as receiving circuitry 402, transmitting circuitry 404, non-transitory computer-readable medium 406, and processor 408 are described in the singular, the plural is contemplated unless limitation to the singular is explicitly stated. In some embodiments of the present disclosure, the at least one receiving circuitry 402 and the at least one transmitting circuitry 404 may be combined into a single device, such as a transceiver. In certain embodiments of the present disclosure, the apparatus 400 may further include a memory and/or other components.

In some embodiments of the present disclosure, the at least one non-transitory computer-readable medium 406 may have stored thereon computer-executable instructions which are programmed to cause the at least one processor 408 to implement the steps of the methods according to embodiments of the present disclosure, for example as described in view of FIG. 2 or 3, with the at least one receiving circuitry 402 and the at least one transmitting circuitry 404. For example, when executed, the instructions may cause the at least one processor 408 to transmit, with the at least one transmitting circuitry 404, a set of first DCI on at least one CORESET for activating a set of SPS configurations, wherein each CORESET is configured with a CORESETPoolIndex, and each of the set of first DCI activates a corresponding one of the set of SPS configurations. The instructions may further cause the at least one processor 408 to transmit, with the at least one transmitting circuitry 404, at least one second DCI on at least one first CORESET configured with a first CORESETPoolIndex, wherein each second DCI only deactivates first one or more SPS configurations of the set of SPS configurations activated by first one or more first DCI transmitted on one or more CORESETs configured with the first CORESETPoolIndex.

Figure 5:
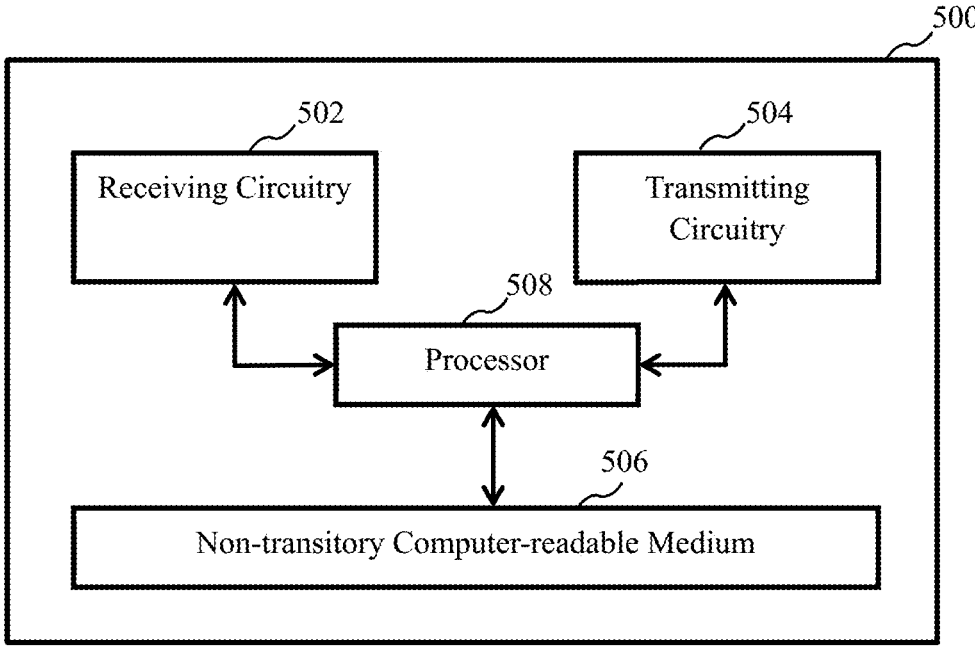
FIG. 5 illustrates an exemplary block diagram of another apparatus according to some embodiments of the present disclosure.

FIG. 5 illustrates an exemplary block diagram of an apparatus 500 according to some embodiments of the present disclosure. In some embodiments of the present disclosure, the apparatus 500 may be or include a UE (e.g., the UE 105*a*, UE 105*b*, or UE 105*c*) or other devices having similar functionality. In some embodiments, the apparatus 500 can be configured to perform the method illustrated in FIG. 2 or 3.

As shown in FIG. 5, the apparatus 500 may include at least one receiving circuitry 502, at least one transmitting circuitry 504, at least one non-transitory computer-readable medium 506, and at least one processor 508 coupled to the at least one receiving circuitry 502, the at least one transmitting circuitry 504, the at least one non-transitory computer-readable medium 506. While shown to be coupled to each other via the at least one processor 508 in the example of FIG. 5, the at least one receiving circuitry 502, the at least one transmitting circuitry 504, the at least one non-transitory computer-readable medium 506, and the at least one processor 508 may be coupled to one another in various arrangements. For example, the at least one receiving circuitry 502, the at least one transmitting circuitry 504, the at least one non-transitory computer-readable medium 506, and the at least one processor 508 may be coupled to each other via one or more local buses (not shown for simplicity).

Although in FIG. 5, elements such as receiving circuitry 502, transmitting circuitry 504, non-transitory computer-readable medium 506, and processor 508 are described in the singular, the plural is contemplated unless limitation to the singular is explicitly stated. In some embodiments of the present disclosure, the at least one receiving circuitry 502 and the at least one transmitting circuitry 504 may be combined into a single device, such as a transceiver. In certain embodiments of the present disclosure, the apparatus 500 may further include an input device, a memory, and/or other components.

In some embodiments of the present disclosure, the at least one non-transitory computer-readable medium 506 may have stored thereon computer-executable instructions which are programmed to cause the at least one processor 508 to implement the steps of the methods according to embodiments of the present disclosure, for example as described in view of FIG. 2 or 3, with the at least one receiving circuitry 502 and the at least one transmitting circuitry 504. For example, when executed, the instructions may cause the at least one processor 508 to receive, with the at least one receiving circuitry 502, a set of first DCI on at least one CORESET for activating a set of SPS configurations, wherein each CORESET is configured with a CORESETPoolIndex, and each of the set of first DCI activates a corresponding one of the set of SPS configurations. The instructions may further cause the at least one processor 508 to receive, with the at least one receiving circuitry 502, at least one second DCI on at least one first CORESET configured with a first CORESETPoolIndex, wherein each second DCI only deactivates first one or more SPS configurations of the set of SPS configurations activated by first one or more first DCI received on one or more CORESETs configured with the first CORESETPoolIndex.

As will be appreciated by one skilled in the art, aspects of the embodiments may be embodied as a system, apparatus, method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration (VLSI) circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, or program code. The storage devices may be tangible, non-transitory, or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but is not limited to being, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Furthermore, the described features, structures, or characteristics of the embodiments may be combined in any suitable manner. While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed is:

1. An apparatus for wireless communication, comprising:
at least one memory; and
at least one processor coupled with the at least one memory and configured to cause the apparatus to:
receive a set of first downlink control information (DCI) on at least one control resource set (CORESET) for activating a set of semi-persistent scheduling (SPS) configurations, wherein each CORESET is configured with a CORESETPoolIndex, and each of the set of first DCI activates a corresponding one of the set of SPS configurations;
receive a set of second DCI on at least one first CORESET configured with a first CORESETPoolIndex, wherein each second DCI only deactivates a first one or more SPS configurations of the set of SPS configurations activated by a first one or more first DCI received on one or more CORESETs configured with the first CORESETPoolIndex;
receive an SPS deactivation state list, wherein each SPS deactivation state corresponding to an entry in the SPS deactivation state list includes one or more SPS configurations,
wherein a first subset of SPS configurations included in a first set of entries in the SPS deactivation state list are activated by a first subset of first DCI received on the one or more CORESETs configured with the first CORESETPoolIndex, and wherein a second subset of SPS configurations included in a second set of entries in the SPS deactivation state list are activated by a second subset of first DCI received on one or more CORESETs configured with a second CORESETPoolIndex.

2. The apparatus of claim 1, wherein the second DCI comprises a first hybrid automatic repeat request (HARQ) process number, the first one or more SPS configurations deactivated by the second DCI received on the first CORESET configured with the first CORESETPoolIndex are included in an SPS deactivation state corresponding to a first entry of the first set of entries in the SPS deactivation state list, and an entry index of the first entry has a first predefined relation with the first HARQ process number.

3. The apparatus of claim 2, wherein the entry index of the first entry equals the first HARQ process number.

4. The apparatus of claim 2, wherein the at least one processor is further configured to cause the apparatus to receive a third DCI on a second CORESET configured with the second CORESETPoolIndex, wherein the third DCI only deactivates second one or more SPS configurations activated by second one or more of the second subset of first DCI received on one or more CORESETs configured with the second CORESETPoolIndex, wherein the third DCI comprises a second HARQ process number, the second one or more SPS configurations deactivated by the third DCI are included in an SPS deactivation state corresponding to a second entry of the second set of entries in the SPS deactivation state list, and an entry index of the second entry has a second predefined relation with the second HARQ process number.

5. The apparatus of claim 4, wherein the entry index of the second entry equals the second HARQ process number plus floor (M/2), floor ( ) is a round down function, and M is a maximum number of entries in the SPS deactivation state list.

6. The apparatus of claim 1, wherein the at least one processor is further configured to cause the apparatus to receive an additional SPS deactivation state list, wherein each SPS deactivation state corresponding to an entry in the SPS deactivation state list includes first at least one SPS configuration activated by first at least one of the set of first DCI received on one or more CORESETs configured with the first CORESETPoolIndex, and each SPS deactivation state corresponding to an entry in the additional SPS deactivation state list includes second at least one SPS configuration activated by second at least one of the set of first DCI received on one or more CORESETs configured with a second CORESETPoolIndex.

7. The apparatus of claim 6, wherein the second DCI comprises a first HARQ process number, the first one or more SPS configurations deactivated by the second DCI received on the first CORESET configured with the first CORESETPoolIndex are included in an SPS deactivation state corresponding to a first entry in the SPS deactivation state list, and an entry index of the first entry corresponds to the first HARQ process number.

8. The apparatus of claim 7, wherein the at least one processor is further configured to cause the apparatus to receive a third DCI on a second CORESET configured with the second CORESETPoolIndex, wherein the third DCI only deactivates second one or more SPS configurations activated by second one or more of the set of first DCI received on one or more CORESETs associated with the second CORESETPoolIndex, wherein the third DCI comprises a second HARQ process number, the second one or more SPS configurations deactivated by the third DCI are included in an SPS deactivation state corresponding to a second entry in the additional SPS deactivation state list, and an entry index of the second entry corresponds to the second HARQ process number.

9. An apparatus for wireless communication, comprising:
at least one memory; and
at least one processor coupled with the at least one memory and configured to cause the apparatus to:
transmit a set of first downlink control information (DCI) on at least one control resource set (CORESET) for activating a set of semi-persistent scheduling (SPS) configurations, wherein each CORESET is configured with a CORESETPoolIndex, and each of the set of first DCI activates a corresponding one of the set of SPS configurations;

transmit a set of second DCI on at least one first CORE-SET configured with a first CORESETPoolIndex, wherein each second DCI only deactivates first one or more SPS configurations of the set of SPS configurations activated by first one or more first DCI transmitted on one or more CORESETs configured with the first CORESETPoolIndex;

transmit an SPS deactivation state list; and transmit an additional SPS deactivation state list, wherein each SPS deactivation state corresponding to an entry in the SPS deactivation state list includes a first at least one SPS configuration activated by a first at least one of the set of first DCI transmitted on one or more CORESETs configured with the first CORESET-PoolIndex, and each SPS deactivation state corresponding to an entry in the additional SPS deactivation state list includes a second at least one SPS configuration activated by a second at least one of the set of first DCI transmitted on one or more CORESETs configured with a second CORESETPoolIndex.

10. The apparatus of claim 9, wherein the second DCI comprises a first HARQ process number, the first one or more SPS configurations deactivated by the second DCI transmitted on the first CORESET configured with the first CORESETPoolIndex are included in an SPS deactivation state corresponding to a first entry in the SPS deactivation state list, and an entry index of the first entry corresponds to the first HARQ process number.

11. The apparatus of claim 10, wherein the at least one processor is further configured to cause the apparatus to transmit a third DCI on a second CORESET configured with the second CORESETPoolIndex, wherein the third DCI only deactivates a second one or more SPS configurations activated by a second one or more of the set of first DCI transmitted on one or more CORESETs associated with the second CORESETPoolIndex, wherein the third DCI comprises a second HARQ process number, the second one or more SPS configurations deactivated by the third DCI are included in an SPS deactivation state corresponding to a second entry in the additional SPS deactivation state list, and an entry index of the second entry corresponds to the second HARQ process number.

12. A method performed by an apparatus, the method comprising:

receiving a set of first downlink control information (DCI) on at least one control resource set (CORESET) for activating a set of semi-persistent scheduling (SPS) configurations, wherein each CORESET is configured with a CORESETPoolIndex, and each of the set of first DCI activates a corresponding one of the set of SPS configurations;

receiving a set of second DCI on at least one first CORESET configured with a first CORESETPoolIndex, wherein each second DCI only deactivates first one or more SPS configurations of the set of SPS configurations activated by first one or more first DCI received on one or more CORESETs configured with the first CORESETPoolIndex; and receiving an SPS deactivation state list, wherein each SPS deactivation state corresponding to an entry in the SPS deactivation state list includes one or more SPS configurations, wherein a first subset of SPS configurations included in a first set of entries in the SPS deactivation state list are activated by a first subset of first DCI received on the one or more CORESETs configured with the first CORESETPoolIndex, and wherein a second subset of SPS configurations included in a second set of entries in the SPS deactivation state list are activated by a second subset of first DCI received on one or more CORESETs configured with a second CORE-SETPoolIndex.

13. The method of claim 12, wherein the second DCI comprises a first hybrid automatic repeat request (HARQ) process number, the first one or more SPS configurations deactivated by the second DCI received on the first CORE-SET configured with the first CORESETPoolIndex are included in an SPS deactivation state corresponding to a first entry of the first set of entries in the SPS deactivation state list, and an entry index of the first entry has a first predefined relation with the first HARQ process number.

14. The method of claim 13, wherein the entry index of the first entry equals the first HARQ process number.

15. The method of claim 13, further comprising; receiving a third DCI on a second CORESET configured with the second CORESETPoolIndex, wherein the third DCI only deactivates a second one or more SPS configurations activated by a second one or more of the second subset of first DCI received on one or more CORESETs configured with the second CORESETPoolIndex, wherein the third DCI comprises a second HARQ process number, the second one or more SPS configurations deactivated by the third DCI are included in an SPS deactivation state corresponding to a second entry of the second set of entries in the SPS deactivation state list, and an entry index of the second entry has a second predefined relation with the second HARQ process number.

* * * * *